Figure 1:
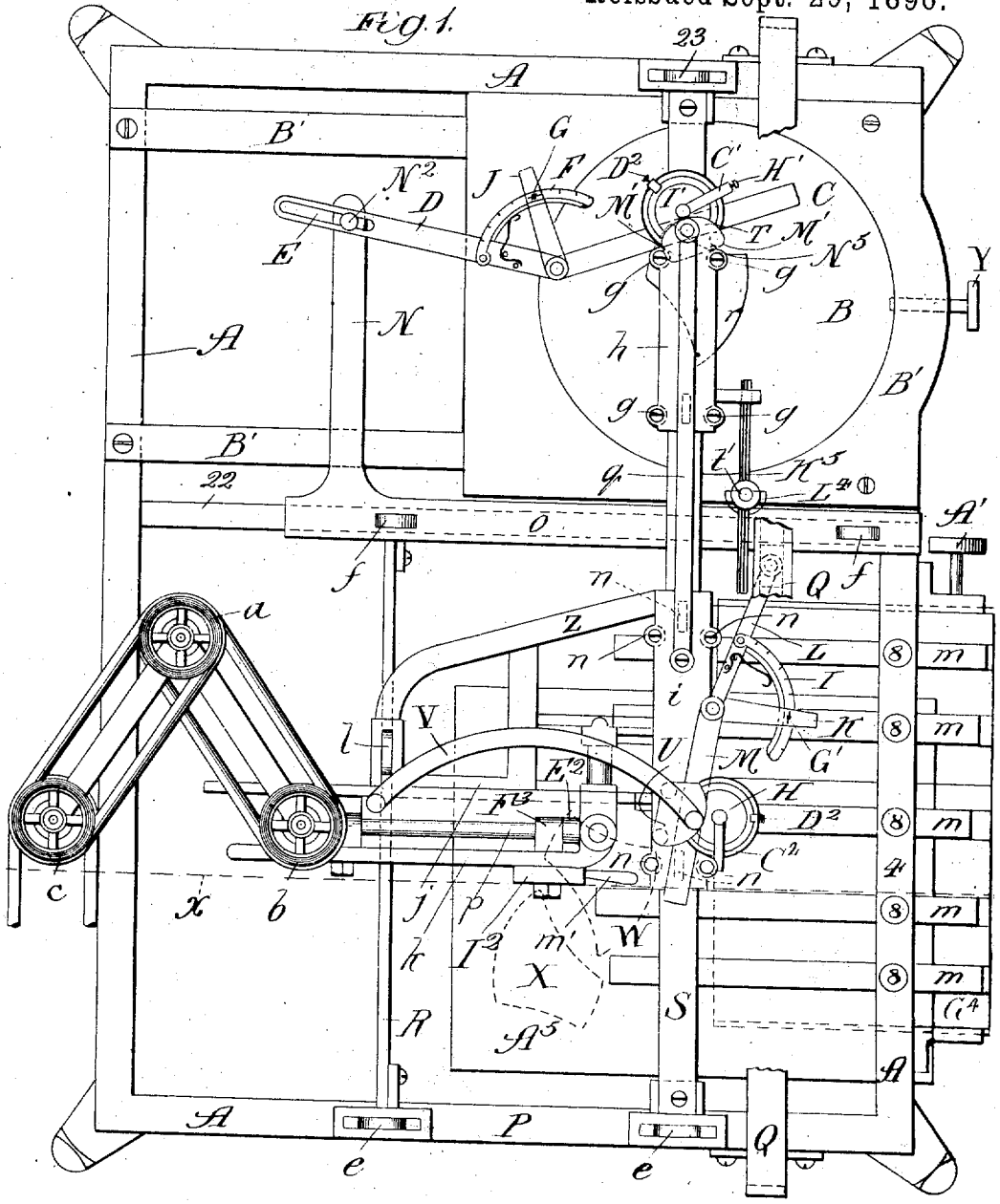

6 Sheets—Sheet 1.

C. E. REED.

PATTERN TRACING AND CUTTING MACHINE.

No. 11,569. Reissued Sept. 29, 1896.

Witnesses:
Richard Spencer
Henry White.

Inventor:
Charles E. Reed,
By Dyrenforth & Dyrenforth
Attys.

C. E. REED.

PATTERN TRACING AND CUTTING MACHINE.

No. 11,569. Reissued Sept. 29, 1896.

Witnesses:
Richard Spencer
Harry White

Inventor:
Charles E. Reed.
By Dyrenforth & Dyrenforth
Attys.

C. E. REED.
PATTERN TRACING AND CUTTING MACHINE.
No. 11,569. Reissued Sept. 29, 1896.
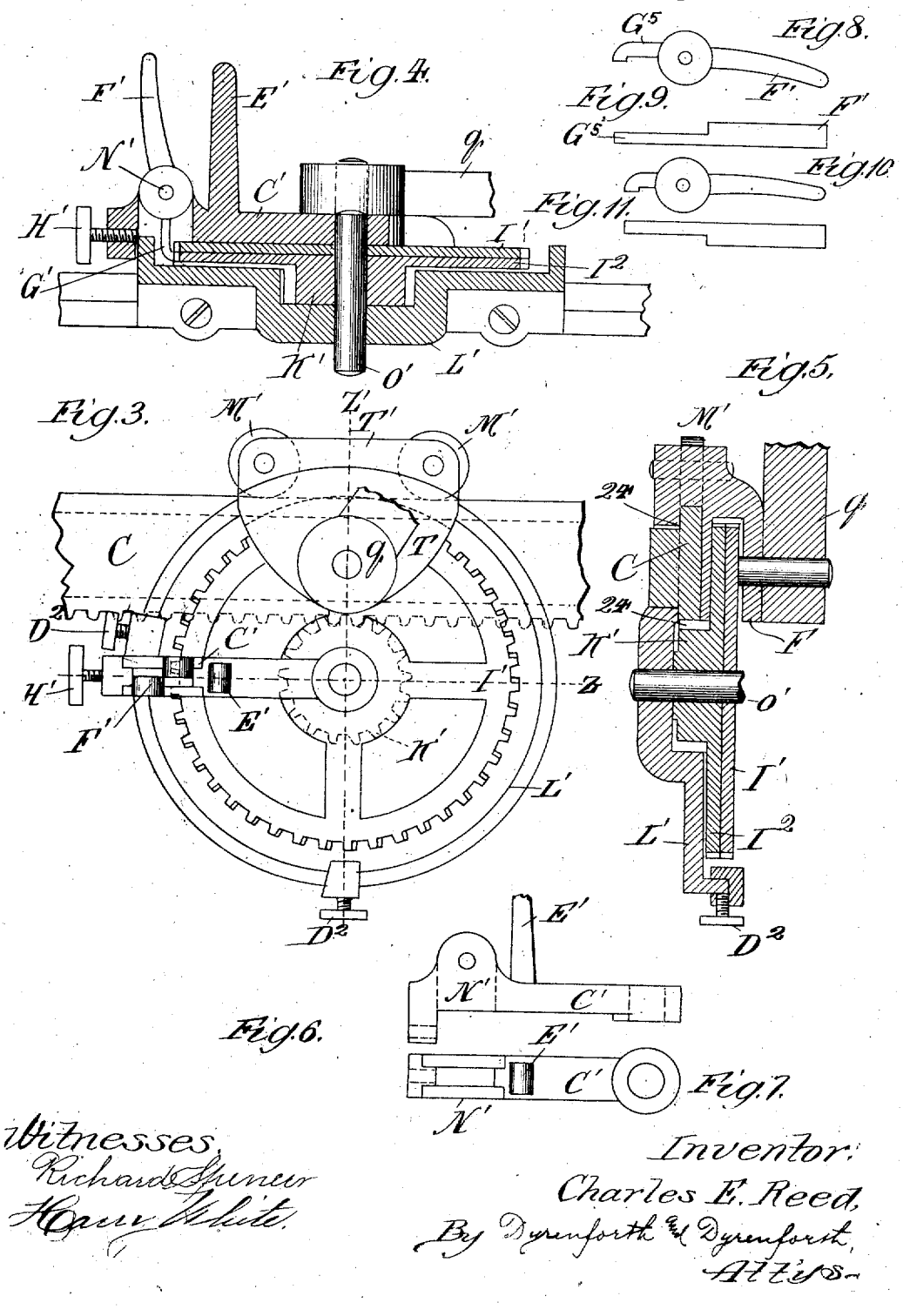
Witnesses,
Richard Spencer
Harry White.
Inventor:
Charles E. Reed,
By Dyrenforth & Dyrenforth,
Attys.

C. E. REED.
PATTERN TRACING AND CUTTING MACHINE.
No. 11,569. Reissued Sept. 29, 1896.
Fig. 12.
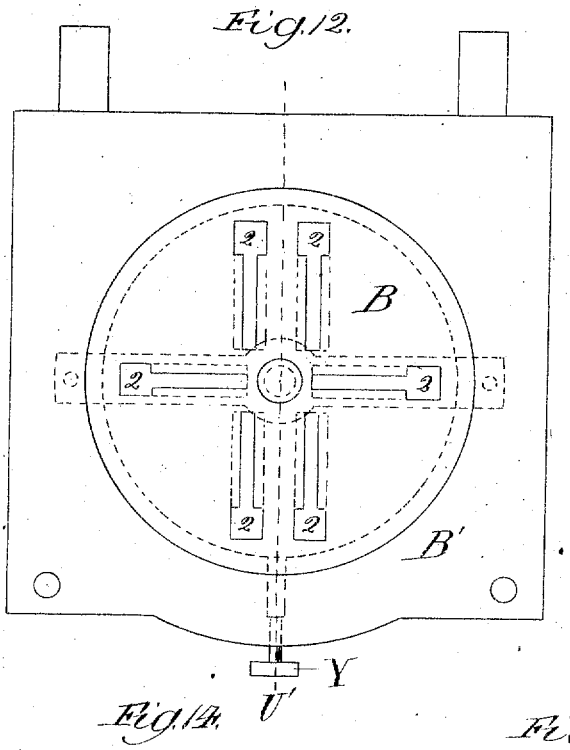
Fig. 13.
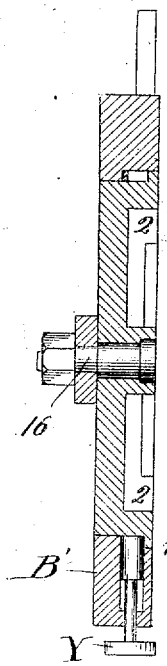
Fig. 16.
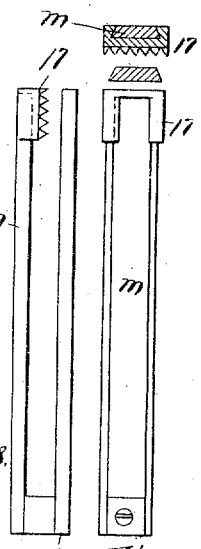
Fig. 14.
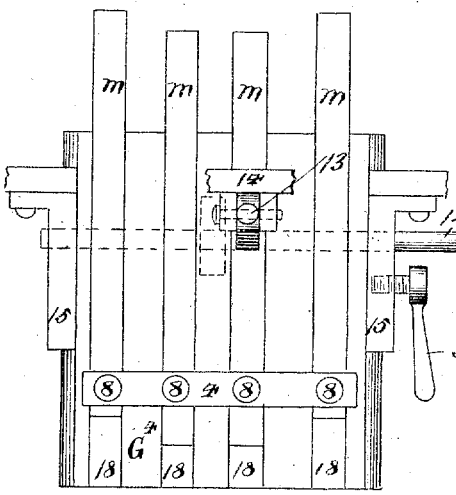
Fig. 15.
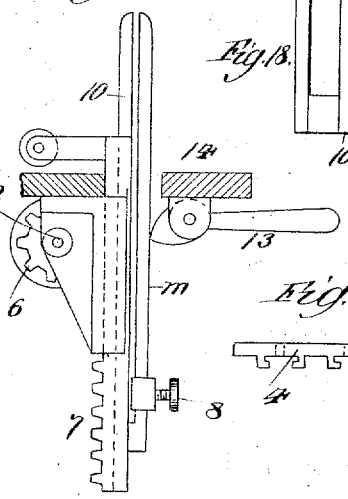
Fig. 18.
Fig. 19.
Fig. 17.
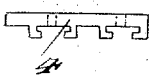
Witnesses:
Richard Spencer
Harry A. Lute
Inventor,
Charles E. Reed,
By Dyrenforth & Dyrenforth
Attys.

C. E. REED.
PATTERN TRACING AND CUTTING MACHINE.
No. 11,569. Reissued Sept. 29, 1896.
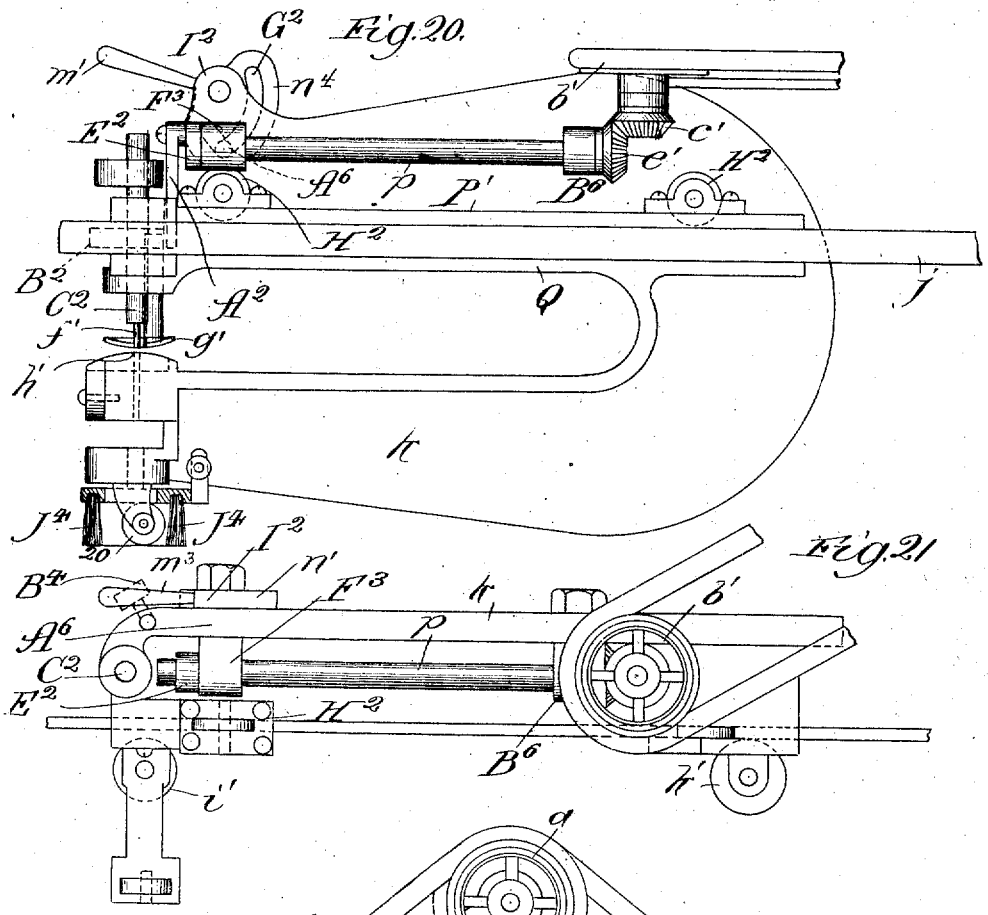
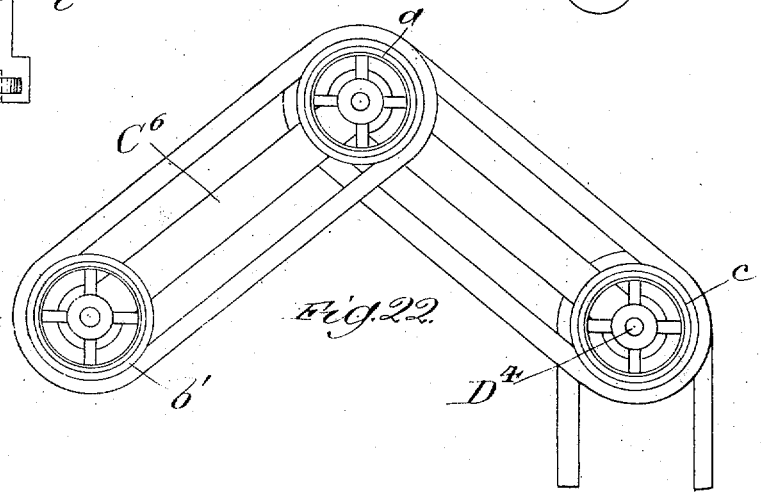
Witnesses.
Richard Shimer
Harry White.
Inventor:
Charles E. Reed.
By Dyrenforth & Dyrenforth,
Attys.

C. E. REED.

PATTERN TRACING AND CUTTING MACHINE.

No. 11,569. Reissued Sept. 29, 1896.

Witnesses:
Chas. E. Gaylord.
Lute J. Fitch.

Inventor:
Charles E. Reed,
By Dyrenforth & Dyrenforth
Att'ys.

UNITED STATES PATENT OFFICE.

CHARLES E. REED, OF CHICAGO, ILLINOIS, ASSIGNOR TO ALBERT G. BEAUNISNE.

PATTERN TRACING AND CUTTING MACHINE.

SPECIFICATION forming part of Reissued Letters Patent No. 11,569, dated September 29, 1896.

Original No. 520,500, dated May 29, 1894. Application for reissue filed February 20, 1896. Serial No. 580,133.

*To all whom it may concern:*

Be it known that I, CHARLES E. REED, a citizen of the United States, residing at Chicago, in the county of Cook and State of Illinois, have invented certain new and useful Improvements in Machines for Cutting Patterns, of which the following is a specification.

My invention relates to improvements in machines for cutting patterns generally, though more especially graded patterns to be employed by shoe-manufacturers in fashioning the uppers and other parts of boots and shoes.

While my machine may be employed in the manufacture of sheet-metal patterns, it is intended more especially for use in cutting the patterns from sheets of cardboard, the cardboard pieces being afterward edged with metal to produce smooth, continuous, and durable cutter-guiding edges. The machine is constructed and operates upon the pantographic principle, employing relatively adjustable and movable parts or frames, one carrying a stylus or tracer and the other a cutter, the pattern being shaped by the cutter from a sheet of material in the movement of the stylus or tracer around a model or profile pattern and the grading of the patterns being performed by the adjustment of the frames or parts of the pantographic mechanism with relation to each other.

Various machines for cutting shoe-patterns, and of the pantographic type, have been hitherto devised, but they are all, so far as I am aware, defective for the reasons that they either employ styluses or tracer-points in the place of cutters, which merely mark the patterns upon the material, so that they have afterward to be cut out with shears or the like, or they employ cutter-knives, which, particularly at the corner portions of the patterns, do not cut true to the model-pattern.

In my improved machine I overcome the objections in the other machines named by employing a reciprocating punch instead of a stylus or cutter-knife, the punch being of the same diameter as the tracer which I employ at the model or profile pattern. The punch which I employ operates with a die to produce a clean cut of the material and is reciprocated at a speed which causes the punched holes to overlap or interlink and produce a continuous cut. The edge of a pattern produced in my machine, though of serrated form, may, if of metal, be smoothed with a file, or, if of cardboard, be rendered smooth by the application thereto of a metallic edging.

In its broadest sense my invention consists in providing in a pattern-cutting machine a support for a profile-pattern or model, a support for a sheet of pattern material, a pantographic frame provided upon one part, at the model-support, with a tracer, and provided upon another part, at the pattern-material support, with a cutter consisting of a die and reciprocating punch.

My invention further consists in the construction of the pantographic mechanism whereby the adjustment for grading the patterns may be quickly and accurately performed; and my invention still further consists in a reversible support for the model or profile pattern, whereby patterns of certain shapes may be cut with greater economy of material than would otherwise be possible; and my invention consists, finally, in the general construction of my improvements, as well as in details of construction and combinations of parts, all as hereinafter set forth and claimed.

Figure 2:
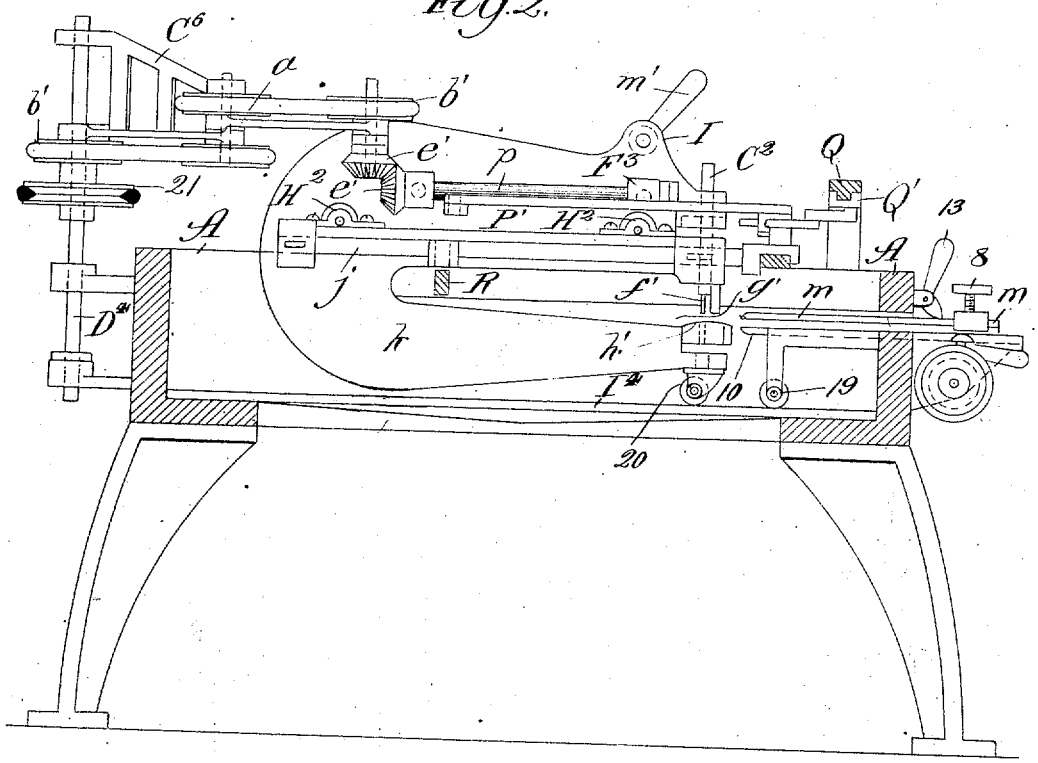
Figure 23:
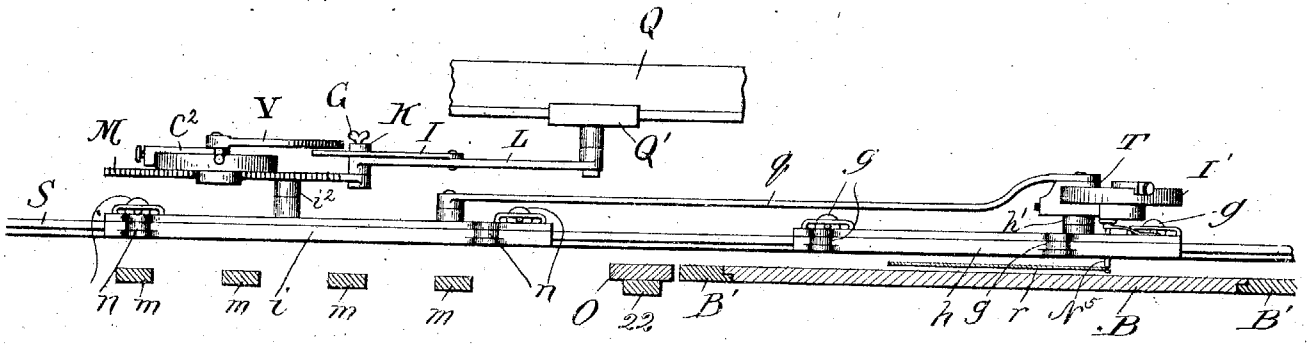
Figure 24:
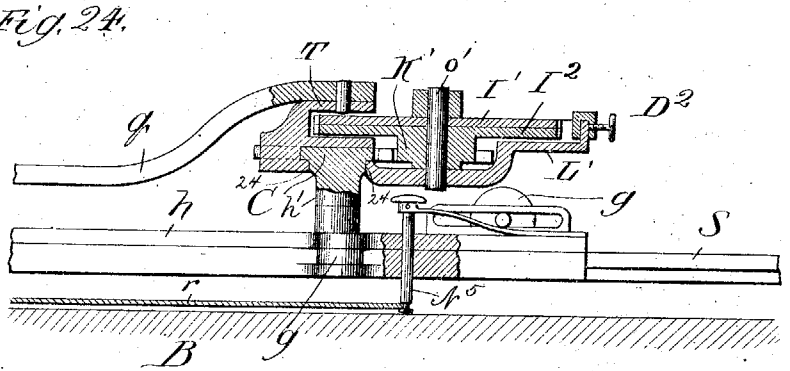

In the drawings, Figure 1 is a top plan view of the machine with parts broken away to expose details which would otherwise be hidden; Fig. 2, a sectional elevation taken on line $x$ of Fig. 1; Fig. 3, an enlarged broken plan view showing features of one of the pantograph-adjusting mechanisms; Fig. 4, a section taken on line Z of Fig. 3; Fig. 5, a section taken on line Z′ of Fig. 3; Fig. 6, a broken side elevation of one of the details of the construction shown in Figs. 3 and 4; Fig. 7, a plan view of the same; Fig. 8, a side elevation of a dog forming part of the mechanism shown in Figs. 3 and 4; Fig. 9, a plan view of the same; Figs. 10 and 11, similar views of the same detail of modified form; Fig. 12, a plan view of a stationary table, showing a reversible model or profile pattern support mounted therein; Fig. 13, a sectional view on line U′ of Fig. 12, but somewhat exaggerated as to the thickness of the parts. Fig. 14, a broken plan view of the adjustable supporting-table for the material from which the patterns are cut; Fig. 15, a sectional view showing the same in side elevation; Fig. 16, a sectional view of one of the clamps employed in holding the material while patterns are being cut therefrom. Fig. 17 is a broken elevation of a bar in which the said clamps are held; Fig. 18, a side elevation of one of the said clamps; Fig. 19, a plan view of the same; Fig. 20, a broken view, partly in section, and showing a movable cutter-carrying yoke in side elevation; Fig. 21, a broken plan view of the mechanism shown in Fig. 20; Fig. 22, a broken and enlarged plan view of a universal power-transmitter which I employ; Fig. 23, an enlarged broken vertical section taken longitudinally of and in front of the bar Q and looking toward the same; and Fig. 24, an enlarged broken section of a rack-lever and an adjustable directing-wheel, with its connections, for changing the sweep of the pantographic frame in the direction lengthwise of the machine.

A is a substantial frame of iron or other suitable material, which supports the operating mechanism hereinafter described.

R S P O N are different parts of a reciprocating carriage. The bars R S are parallel with each other, and at one end of the machine they are connected by the bar P. Journaled in the bar P are rollers *e*, which travel upon a track formed by the upper surface of the frame A. The bar O is parallel with the bar P and is provided with rollers *f f*, which travel upon a track 22, which forms a part of the main frame A. The bar S extends entirely across the frame A and is provided at one end, as shown, with a roller 23, which travels upon a track formed by the upper surface of the frame A. The part N of the reciprocating carriage is an arm extending from the bar O. The construction is such that the carriage R S P O N, with the parts supported thereby and hereinafter described, is adapted to reciprocate in the direction parallel with the end frames of the machine.

B is a circular table or disk mounted to turn in a bed-plate B′, which is secured to the main frame A of the machine. The table B forms the support for the model or profile-pattern and is adapted to be turned a one-half revolution, whereby the profile-pattern thereon may be reversed and patterns cut, as hereinafter described, out of material $A^5$, as shown by dotted lines X W, Fig. 1, so that the largest number of patterns may be cut from a sheet of material.

I′ is a wheel journaled upon a post *o*′, affixed to a frame L′. Integral and concentric with the wheel I′ is a pinion K′, which meshes into the teeth of a rack-lever C, so that when the wheel I′ is turned it will move upon the rack-lever with the frame L′ longitudinally of the rack-lever. The rack-lever C is held in engagement with the pinion K′ by means of the guide-rabbets 24 24, Fig. 5, which are within the frame L′.

Forming a part of the rack-lever C is a lever J, and at the junction of the said levers is pivoted a bar or lever D, provided in its free end portion with a slot E, at which it is fulcrumed upon a pin $N^2$, carried by the arm N. The lever D carries a segmental frame or quadrant F, preferably marked with a scale, and the arm or lever J is adjustable along the scale of the said quadrant and may be fastened in adjusted position to the quadrant by means of the set-screw G. The wheel I′ is provided with peripheral teeth. Fulcrumed upon the post *o*′ is a lever or radial arm C′ carrying a pivotal dog F′ G′, engaging the teeth of the wheel I′. A change in the pantographic mechanism to vary the relative movement between the stylus or tracer and the cutter, both hereinafter described, in the vertical direction in Fig. 1 is effected by turning of the wheel I′ to move it upon the rack C. Turning of the arm C′ while the dog F′ G′ engages a tooth of the wheel I′ turns the latter and the pinion K′ to move the frame L′ upon the rack C and effect the change in the pantographic mechanism stated. In the end of the arm C′ is a set-screw H′, adapted to bear against the rim of the frame L′, whereby, after it has been swung to turn the wheel I′, it may be locked rigidly against further movement. To save the necessity of cutting fine teeth on the wheel I′, I prefer to employ with the said wheel a subwheel $I^3$, the teeth of which overlap half the interspace between the teeth of the wheel I′. The wheels I′ $I^3$ are fastened together, and upon the arm C′ is a second dog, as shown at Figs. 3, 10, and 11. On the frame L′ are two adjustable stops $D^3$, which may be adjusted to regulate the throw of the radial arm C′. A cap T, forming a rigid portion of the frame L′, extends part way over the wheel I′, and on the cap are rollers M′ which bear against the outer or smooth edge of the rack-lever C and hold the teeth in mesh with the pinion K′. A reciprocating carriage *h*, Fig. 1, is provided with antifriction-rollers *g* and fitted to travel readily on the bar S of the main carriage. The rack-lever C is pivotally connected with the carriage *h* by means of a downwardly-extending pin or lug *h*′, forming an integral part of the rack-lever.

On the bar S is a carriage *i*, provided with antifriction-rollers *n*, which travel upon the said bar. The rod *q* is pivotally connected at its opposite ends, respectively, with the carriage *i* and with the cap or head T on the frame L′, whereby any change in motion of the carriage *h* in the vertical direction in Fig. 1 is communicated to the carriage *i*. The carriage *h* carries the stylus or tracer $N^3$.

Z is a supporting or brace bar connected at one end with the carriage *i* and at its opposite end provided with a roller *l*, which travels upon the bar R.

When the stylus $N^5$ is moved in the direction toward the front or back of the machine, that is to say, to the right or left in Fig. 1, it moves the carriage $h$, bar S, and consequently the rest of the frame R P O N in the same direction, and when the stylus is moved in the direction longitudinally of the frame it slides the carriage $h$ on the bar S. When the frame L′ is moved or adjusted, by means of the wheel I′, upon the rack-lever C, to or coincident with the pin $h'$, movement of the stylus and carriage $h$ will cause an equal movement of the carriage $i$ through the medium of the rod $q$. When the frame L′ is moved or adjusted toward the free end of the rack-lever C, movement of the stylus and its carriage $h$ longitudinally of the machine, which turns the rack-lever C, by means of the pivotal connection $h'$, on the pin or fulcrum $N^2$, causes the frame L′ to move with the free end portion of the lever faster than the carriage $h$, and thus increase the distance of movement of the carriage $i$ over that of the carriage $h$ and stylus in proportion to the distance at which the frame L′ is adjusted from the pivotal connection $h'$. When the frame L′ is adjusted along the rack-lever away from the pivotal connection $h'$ and in the direction of the fulcrum $N^2$, the movement of the carriage $i$ will be proportionately less than that of the carriage $h$ in the movement of the stylus longitudinally of the machine. The longitudinal movement of the carriage $i$ effects the same movement of the pattern-cutter or reciprocating punch. Consequently the sweep of the cutter with relation to the stylus in the direction longitudinally of the machine is regulated by the position of the frame L′ on the rack-lever C.

H is a wheel in all respects a duplicate of the wheel I′ and carrying a like pinion and mounted in a like frame, and having an overlapping portion U similar to the part T described. The frame of the wheel H is adjustable along a rack-lever M, in every respect like the rack-lever C and pivotally connected with the carriage $i$ by a pin or lug $i^2$, and the mechanism shown at K I L G′ is identical with that shown at J, F, D, and G, heretofore described. The inner end of the lever L is pivoted, as indicated, to a carriage or sliding block Q′, mounted against the under side of a bar Q, which forms a rigid and elevated portion of the main frame of the machine.

$k$, Figs. 1, 2, 20, and 21, represents a yoke-head, which, by means of the rollers $H^2$, $k'$, and $i'$, is arranged to have a reciprocating movement on a track $j$ and by a roller 20 to travel on a platform $I^1$. The bar or track $j$ forms a part of the main sliding carriage of the machine. The platform $I^1$ is a part of the main frame. Carried by the yoke on opposite sides of the roller 20 are brushes $H$, which, in the movement of the yoke, keep the platform $I^1$ clean for the roller 20 to travel thereon without obstruction.

A connecting-bar V is pivoted at one end to the overlapping portion U of the frame of the wheel H and at its opposite end is pivoted to the yoke $k$. The lever M is a rack-bar like the bar C, described, and the wheel H and its frame with the part U thereof may be moved longitudinally upon the rack M by turning the wheel H on its axis. The turning of the wheel H is effected by means of a radial arm $C^2$, provided with a dog, all constructed like the arm C′ and dog carried thereby, before described. Any change in adjustment of the part U on the bar M toward or away from the fulcrum $i^2$ of the bar effected by turning the wheel H changes the pantographic mechanism in a manner to vary the relative movement of the tracer-point or stylus and cutter in the horizontal direction in Fig. 1.

The rack bar or lever M is fulcrumed at the sliding block Q′ and pivotally connected at $i^2$ with the sliding carriage $i$. Thus the relative sweep or movement of the cutter in the direction from front to back of the machine is increased by adjusting the part U toward the free and of the rack M and diminished by moving the part U in the opposite direction upon the rack.

From this description it will be seen that I provide three distinct movements, one of the main carriage transversely of the machine, a movement by means of the carriage $i$ and $h$ longitudinally of the machine, and a reciprocating movement of the yoke $k$ independent of the movement of the main carriage.

In the enlarged view, Fig. 20, $h'$ represents a convex die, which is provided with a vertical hole corresponding to the diameter of a round punch $f'$, such form of die giving a better cutting edge than one flat on its top portion. The punch $f'$ is supported in a post $C^2$, having a vertical bearing in the yoke-head $k$. An angular connecting-rod $A^3$ $B^2$ engages the post and is pivoted to an eccentric $E^2$, which is concentrically connected with a shaft $p$, and is driven thereby to give to the punch $f'$ a vertical reciprocating motion.

$F^3$ represents an adjustable shaft-bearing adjoining the eccentric, and is vertically adjustable by means of a pin $A^6$, secured thereto and projecting through a slot $G^2$ in a segment-piece $n^4$. A cam-lever $m^3$ is pivoted to a fixed lug $I^2$ on the yoke-frame, and its lower end engages the pin $A^6$, so that when the lever is brought down the bearing $F^3$, shaft $p$, post $C^2$, and punch $f'$ will be elevated above the material $A^5$, which rests on the die $h'$. Thus while the punch is reciprocating it may be raised above the material and held against cutting the latter.

$B^6$ represents the bearing for the rear end portion of the shaft $p$, and $e'$ $c'$ are beveled gears which connect the shaft $p$ with a pulley $b'$. $C^6$ is a frame which swings on a post $D^1$. (See Fig. 2.) Rotating upon the post is a wheel 21, driven by any suitable power. Integral with the wheel 21 is a wheel $b'$. The frame $C^6$ consists of two arms pivoted together at their ends, and at their point of pivotal connection forming the bearing for a pulley $a$, which is belted to the pulley $c$. The end of the jointed frame $C^6$ connects with the yoke $k$ and there affords the bearing for the pulley $b'$. By this means the pulleys $a\ b'\ c$ and the gear $e'$ are driven to rotate the shaft $p$ and rapidly reciprocate the punch $f'$.

On the lower end of a dependent standard, forming a part of the yoke-frame, is a foot $g'$, (see Fig. 20,) which operates to keep the material $A^5$ from rising from the die $h'$ in the upstrokes of the punch $f'$.

The table for holding and adjusting the material $A^5$ to be cut is shown at $G^4$, and in it are formed a series of dovetail grooves 18, in which are mounted two-pronged clamps $m$. The lower prongs 10 of the clamps slide in the grooves 18 of the table $G^4$, and the upper prongs slide in rabbeted grooves formed in the under face of an upper cross-bar 4. The bar 4 is secured to the table $G^4$ and is tapped coincidently with the clamps for set-screws 8. The clamps may be adjusted longitudinally by sliding them in their guides in the table $G^4$ and cross-bar, and when adjusted may be fastened against movement by means of the set-screws 8. As I prefer to construct the clamps $m$, the upper prongs are provided with teeth 17. Extending transversely across the table $G^4$, and rigidly secured thereto, is a bar 14, and pivoted upon the bar at each clamp $m$ is a cam-lever 13. When the levers are turned in the downward direction, the cams press upon the upper prongs of the clamps and cause them to be pressed at their teeth 17 firmly against the material $A^5$, which extends between the prongs. The table $G^4$ is mounted in guide-ways 15, forming a part of the main frame of the machine, and to the table is attached a rack 7. The ways are provided with bearings for a shaft 12, on which is mounted a pinion 6, engaging said rack and provided with a wheel A'. Turning of the wheel A' moves the table and material carried thereby in the direction transversely of the machine, or horizontally in Fig. 1. Rigidly connected with the carriage $h$ is a rod $K^5$, extending through a guide-block $L^4$, mounted on the bar O. In the block is a set-screw $l'$, which may be turned to clamp the rod $K^5$ to the block $L^4$. In changing the adjustment of the pantographic mechanism it is desirable that one part thereof shall be held rigidly against movement while the other part is being adjusted, and the rod $K^5$ and the means for locking it in place effect this purpose.

The machine shown and described is intended more especially for use, as before stated, in cutting profile-patterns from sheets of cardboard $A^5$, the patterns thus cut being shaped by the movement of a stylus or tracer $N^5$ about a model or profile pattern $r$ and graded by changes in adjustment of the pantographic mechanism.

In operation a preferably sheet-metal model or profile pattern $r$ is placed upon the table B and fastened firmly in position at the slots 2. The pantographic mechanism is then adjusted as follows: The set-screw G at the segment F is loosened and the arm J adjusted along the segment in accordance with the scale marked on the segment to cause the arm or lever D and rack C to extend at desired angles with relation to each other. A change in angle between the rack C and arm or lever D effects a change in the distance of movement of the punch or cutter $f'$ with relation to the movement of the tracer in the direction longitudinally of the machine, which is the vertical direction in Fig. 1, thus permitting the operator to change quickly the length of the pattern in that direction. The wheel I', which I term a "directing-wheel," is turned to assume a desired position with reference to the rack C.

Presuming that the operation is to start by cutting out a pattern of the largest size desired and then patterns graded down to the smallest size desired, the rack C and arm D will be adjusted to an angle which will cause the rack, when engaged at one end portion by the wheel I', to give to the cutter or punch $f'$ the greatest sweep desired with relation to the movement of the tracer in the direction lengthwise of the machine. Patterns of the class indicated by $r$ in Fig. 1 are usually graded to present a difference in length of one-third of an inch between grades, and to effect this difference the stops $D^3$ at the wheel I' will be adjusted so that in the movement of the radial arm C' from one stop to the other the wheel will be turned to move upon the rack C a distance which will effect a variation of one-third of an inch in the movement in the said longitudinal direction of the cutter with relation to the tracer. The arm or lever L and rack M are then adjusted to a desired angle with relation to each other in accordance with a scale upon the segment I, and the wheel H is rotated until it engages the end portion of the rack M, in order that the movement or sweep of the cutter may be to the greatest distance desired with relation to the movement of the tracer in the direction transversely of the machine. Patterns of the class shown are usually caused to vary one-quarter of an inch between grades in the direction in which change is effected by this adjustment, and the stops $D^2$ should be so adjusted that in the movement of the radial arm $C^2$ between them the wheel H will be turned to move it upon the rack M a distance which will change the transverse sweep of the cutter one-quarter of an inch with relation to the sweep of the tracer. The material $A^5$ is then passed between the clamps and between the die $h'$ and foot $g'$. The cap T is then grasped by the operator and moved to cause the tracer to engage the edge of the pattern $r$. The operator then turns the handle $m'$ to lower the die-stock $C^2$ and punch $f'$, so that the latter will reciprocate into and out of the die $h'$ and in each downward movement punch a hole through the material $A^5$. The cap T is then moved to cause the tracer to follow the outline of the pattern $r$, whereby the pantographic mechanism causes the yoke $k$ to pursue the same course and cause the punch to cut holes in the material $A^5$ along a line of exactly the same contour as the pattern $r$. The punch is caused to reciprocate so rapidly that the holes it produces intermesh or overlap. Thus in the movement of the punch a continuous cut is produced. When the tracer has traversed completely around the pattern $r$, a pattern X will have been cut from the material and drop out of the way. The handle $m'$ is then turned to raise the die-stock and punch, so that in the reciprocation of the latter it will move in a plane above the material. The clamps $m$ are then loosened and the material moved along to present a new surface from which the next pattern is to be cut. As the next pattern is to be a grade smaller than the first the dogs $F'$ $G^5$ will be moved to release the wheel I', the set-screw H' will be loosened, and the radial arm C' moved to the opposite stop $D^2$, after which the dog will be released, so as to engage the wheel I', and the arm $C^2$ will be moved back to the initial stop $D^2$, whereby the wheel I' is turned to slide the rack C and effect a change of one-third of an inch in the sweep of the punch with relation to the tracer in the longitudinal direction. The wheel H will be turned in the same way to change the adjustment of the pantographic mechanism and effect a change of one-quarter of an inch in the relative sweeps of the cutter and tracer in the direction transversely of the machine. The operation may be continued until adjustments have been made to the limits of the lengths of the racks C M.

Whenever it is desired to shorten or increase the length of the pattern being cut with relation to the profile-pattern and without varying the relative width, the operator may, after moving the tracer across the base and up one side of the profile-pattern, change the adjustment at the segment J to shorten or lengthen the relative sweep of the cutter and then, after moving the tracer across the upper edge of the pattern, change the adjustment back again. A variation in the width of the pattern being cut may also be effected at any time during the operation by temporarily changing the adjustment of the relative angle of the parts L M.

The table B is capable of rotating a one-half revolution, and may be fastened at either limit of its movement by a set-screw or pin Y, which passes through the edge portion of the bed-plate B, as shown. Thus when one pattern has been cut the pin Y may be loosened, the table B turned a half-revolution, and the pin tightened again, whereby the pattern $r$ is reversed between operations to economize material, as is indicated by the dotted pattern X W in Fig. 1.

What I claim as new, and desire to secure by Letters Patent, is—

1. In a pattern-cutting machine, the combination with a model-support and a support for a sheet of pattern material, of a pantographic frame, a tracer on one part of the frame, at the model-support, and a die and reciprocating punch on another part of said frame at the pattern-material support, substantially as and for the purpose set forth.

2. In a pattern-cutting machine, the combination of a support for a sheet of pattern material, a reversible support for a model, a pantographic frame, a tracer on one part of the frame, at the model-support, and a die and reciprocating punch on another part of said frame, at the pattern-material support, substantially as and for the purpose set forth.

3. In a pattern-cutting machine, the combination with a model-support, and a support for a sheet of pattern material, of a pantographic frame, a tracer on one part of the frame at the model-support, a movable yoke-frame connected with another part of said pantographic frame, a die on the said yoke-frame at the pattern-material support, a punch mounted in the said yoke-frame, and means for reciprocating the punch into and out of the die, substantially as and for the purpose set forth.

4. In a machine for cutting patterns from profile-patterns, the toothed directing-wheel I' carrying the pinion K'; its surrounding frame L'; the pivoted radial portion C' carrying a pivoted dog, engaging said toothed wheel; the reciprocating carriage $h$ joined to the said frame; the elbow lever J, C; quadrant F, in combination with an arm N on the main carriage; a table for the support of the profile-pattern and a traversing-point; as and for the purpose specified.

5. A revoluble table supporting the profile-pattern in combination with a suitable frame-seat; a set-screw extending through the frame and engaging the revoluble table, and a traversing-point engaging the edge of the profile-pattern in combination with a directing-wheel having a surrounding frame and adjustable on a post therein, a guide in the frame and the lever C operating therein the levers J, D and quadrant F, the carriage $h$ mounted on the bar S, and a rod $K^5$ affixed to the carriage and adjustable on the main carriage, as and for the purpose specified.

6. The directing-wheel H, rack-lever M, the elbow K, lever L, quadrant I, the carriage $i$ and the rod $q$ connecting it with the carriage $h$, and the bar V pivoted to the portion U, of the frame of wheel H and with the frame of the yoke-head $k$, of the machine, and the head carrying the punching mechanism and having a reciprocating movement on the bar $j$; substantially as specified above.

7. The reciprocating yoke-head $k$, carrying the drive-shaft $p$, and an eccentric on the shaft operating the post of the punch, a die on the lower bar of the yoke-head, and the punch operating in the die in combination with a reciprocating feed-table provided at its top portion with two-pronged arms and cam-levers for shutting the prongs together, as specified and shown.

8. The reciprocating yoke-head carrying a main drive-shaft, the reciprocating post and punch therein, an eccentric on the shaft operating the post, and a lever and guide attachment by which the punch while in motion is held above the die in combination with the main reciprocating carriage, the connecting-bar V, the wheel H, its frame and cap portions U, levers L, M, K, quadrant I, carriages $i$, $h$, and connecting-rod $q$, as specified and shown.

9. The table $G^1$, provided with dovetail grooves, and the lower prongs of two-prong clamps adjustable longitudinally therein, means for adjusting the table on the machine, and cam-levers operating on the upper prongs of the clamps, substantially as specified.

CHARLES E. REED.

In presence of—
J. H. LEE,
RICHARD SPENCER.